(12) United States Patent
Merli et al.

(10) Patent No.: US 7,956,014 B2
(45) Date of Patent: Jun. 7, 2011

(54) SELF-BREAKABLE YIELD POINT ENHANCER FOR OIL BASED DRILLING MUD

(75) Inventors: Luigi Merli, Sugar Land, TX (US); Guido De Stefano, Houston, TX (US); Giuseppe Li Bassi, Gavirate (IT)

(73) Assignee: Lamberti SpA, Albizzate (IT)

( * ) Notice: Subject to any disclaimer, the term of this patent is extended or adjusted under 35 U.S.C. 154(b) by 578 days.

(21) Appl. No.: 11/572,337

(22) PCT Filed: Jul. 20, 2004

(86) PCT No.: PCT/IT2004/000396
§ 371 (c)(1),
(2), (4) Date: Sep. 5, 2008

(87) PCT Pub. No.: WO2006/008765
PCT Pub. Date: Jan. 26, 2006

(65) Prior Publication Data
US 2008/0318810 A1    Dec. 25, 2008

(51) Int. Cl.
*C09K 8/38* (2006.01)

(52) U.S. Cl. ............ 507/131; 507/138; 528/291
(58) Field of Classification Search .......... 507/131, 507/138; 528/291
See application file for complete search history.

(56) References Cited

U.S. PATENT DOCUMENTS

| | | | | |
|---|---|---|---|---|
| 4,330,339 A * | 5/1982 | Nimerick | ............ | 106/243 |
| 4,816,551 A * | 3/1989 | Oehler et al. | ............ | 528/295.3 |
| 4,822,507 A * | 4/1989 | Kanamori et al. | ............ | 508/335 |
| 5,681,915 A * | 10/1997 | Lechner et al. | ............ | 528/74.5 |
| 5,705,663 A * | 1/1998 | Brock et al. | ............ | 554/110 |
| 2004/0038829 A1 * | 2/2004 | Thaemlitz | ............ | 507/100 |

* cited by examiner

*Primary Examiner* — Randy Gulakowski
*Assistant Examiner* — Alicia Toscano
(74) *Attorney, Agent, or Firm* — Mossman, Kumar & Tyler, PC (57) ABSTRACT

The present invention relates to a liquid, self-breakable, temporary viscosifier agent (yield point enhancer) for oil based drilling muds, obtained by reacting one or more dicarboxylic fatty acids with a secondary dialkanolamine and thereafter with a tertiary tialkanolamine, and to oil based drilling muds containing it.

20 Claims, 6 Drawing Sheets

SELF-BREAKABLE YIELD POINT ENHANCER FOR OIL BASED DRILLING MUD

TECHNICAL FIELD

The present invention relates to a liquid, self-breakable, temporary viscosifier agent (yield point enhancer) for oil based drilling muds, obtained by reacting one or more dicarboxylic fatty acids with a secondary dialkanolamine and thereafter with a tertiary trialkanolamine.

Drilling systems involve the use of two main kinds of mud: water based mud (WBM) and oil based mud (OBM).

Water-in-oil emulsions muds, or inverted emulsion muds, are the most used OBM.

Drilling muds (or drilling fluids) are very complex system; they involve the use of different chemicals such as emulsifiers, wetting agents, brines, oils, rheological modifiers, fluid loss control additives and weighting agents.

The mud performs a number of functions, such as removing drill cuttings, lubricating the bit, coating the wellbore surface to avoid flow of fluids in and out of the wellbore, helping to support the weight of the drill pipe and casing.

In today's operations, drilling fluids are pumped under great pressure through a long pipe, reach the very bottom of the drill hole through the center of the drilling bit, then they are returned to the surface through the small annulus between the outside of the pipe itself and the borehole wall or casing.

The theoretical perfect drilling fluid is pseudoplastic, showing a low viscosity when sheared, such as under agitation or circulation, but thickening when the shearing action is stopped, holding cuttings in place and avoiding sagging; the fluid should thicken rapidly, reaching a sufficient gel strength before suspended material settles out.

This behavior should be reversible independently from the temperature.

Therefore drilling muds require the addition of one or more rheology modifiers to maintain proper viscosity and stability.

Oil based drilling muds, and particularly those designed for offshore deep water drilling, are mainly water-in-oil emulsions of mineral oils, or olefins or paraffins or mixture thereof.

A major constituent of these oil based drilling fluids are organophilic clays: large amounts of colloidal or gelling agents are required to obtain the desired rheology of the mud and organophilic clays mostly perform these action while operating.

A fairly big amount of clays is usually necessary to give the desired pseudoplastic properties to the mud.

The solids added to the mud are usually intended to increase the specific gravity of the mud itself: during drilling operations the counter-pressure of the oil or gas from reservoir can be very high and a high density drilling fluid is always recommended. One of the most utilised weighting agents is barite.

OBM for offshore drilling are generally prepared on dry land and then shipped to the platforms; they should therefore be stable for quite a long time, during transportation and until they reach their operative site.

Unfortunately it is very difficult to activate (swell) the organophilic clays during the preparation of the mud; a high shear might be used to provide heat and help the swelling of the clays, but most plants do not have the appropriate equipment.

Therefore it is normally necessary to add to the mud a yield point enhancer which is able to temporarily emulate the function of the clays until they develop their full viscosity.

BACKGROUND ART

Many yield point enhancer are known, such as the amide resin additives disclosed in U.S. Pat. No. 4,816,551.

Oil based muds containing such amide resin additives exhibit high solids carrying capacity but also show increasing values of viscosity when exposed to low temperatures; their use for off-shore deep sea drilling operation is therefore mostly critical.

For offshore operation the low temperature of the sea is always to be taken into account, as the effect of the yield point enhancers is usually strongly dependent from temperature (the lowest the temperature, the highest the risk of undesired gelling of the mud).

Drilling operations are not continuous processes; many stops must necessarily take place and it is then that the risk of an excessive viscosity of the mud, due to the presence of a yield point enhancer, can create serious problems.

When drilling operation takes place in non-deep water, particular caution and additional tests are required to correctly dose the yield point enhancer.

When deep water drilling operations are performed, the temperature of the sea falls near to zero Celsius degrees, and the risk of gelling of the mud is very high, especially during stops.

It would therefore be highly desirable to find a self-breakable yield point enhancer for oil based drilling muds showing high solids carrying capacity during transportation and whose viscosifying effect ceases as soon as drilling actually takes place, thus leaving the rheology control of the mud to the organophilic clays.

DISCLOSURE OF INVENTION

According to a fundamental aspect of the invention, it has now been found that, a yield point enhancer obtained from the reaction of one or more dicarboxylic fatty acids with a secondary dialkanolamine and thereafter with a tertiary trialkanolamine, even when dosed in small quantities, provides to oil based drilling muds high solids carrying capacity during transportation, preventing the settling out of the solids from the moment of the preparation of the mud until the mud reaches its working destination.

The yield point enhancer of the invention emulates the properties of a swollen organophilic clay, giving temporarily to the mud high yield point and gel strength without increasing the plastic viscosity.

This effect disappears during drilling operation, releasing the total control of the rheological properties to the organophilic clay and without further modifying the rheological properties of the oil based mud.

The yield point enhancer of the invention is able to thicken the mud even when low viscosity oils are used as the external phase of the inverted emulsion; it provides a high yield point, a quick way to reach a high gel strength, while maintaining a low plastic viscosity.

According to a fundamental aspect, the yield point enhancer of the invention is an ester amide obtained reacting one or more dicarboxylic fatty acids with a secondary dialkanolamine and thereafter with a tertiary trialkanolamine.

The yield point enhancer of the invention is prepared by a two step process.

In the first step about one molar equivalent of the dicarboxylic fatty acids is reacted with about one molar equivalent of the secondary dialkanolamine, preferably of diethanolamine.

In the second step, the intermediate is reacted with about one third of molar equivalent of a tertiary trialkalkanolamine, preferably of triethanolamine, to obtain the desired ester amide.

In both steps water is collected and eliminated from the reaction vessel.

The first step of the process is performed at about 150° C., and external heating is required; preferably, the dialkanolamine is slowly added into a reaction vessel where the dicarboxylic acid has previously been charged; and the reaction mixture is kept stirred until about one molar equivalent of water is collected.

No isolation of the intermediate is required.

The second steps is lightly exothermic and the reaction is carried on preferably at 120-150° C. by slowly adding the trialkanolamine; the reaction mixture is kept stirred until about one molar equivalent of water is collected.

Both steps are preferably carried on in the presence of a solvent.

The preferred solvents are glycols, gycol ethers, or mixture thereof; we cite as examples of suitable solvents: diethylene glycol mono-n-butyl ether, diethylene glycol ethyl ether, ethylene glycol mono-n-butyl ether, butoxytriglycol.

The most preferred glycol ether is butoxytriglycol.

Optionally, to adjust the viscosity of the final product, one or more suitable diluents, such as propylene carbonate or a glycol or glycol ether (such as those cited above as suitable solvents), or mixture thereof, can be added after step (ii).

Preferably, the total quantity of solvent and diluent in the yield enhancer according to the invention is from 30 to 70 wt %, more preferably from 40 to 60 wt %.

The dicarboxylic fatty acids useful for the realization of the invention are those having general formula HOOC—R—COOH, wherein R is an alkylene group containing from 10 to 50 carbon atoms, preferably from 20 to 40 carbon atoms.

The secondary dialkanolamine has the general formula HO—R'—NH—R'OH, wherein R' is an alkylene group containing from 1 to 6 carbon atoms.

The tertiary trialkanolamine has the general formula $N(-R''OH)_3$, wherein R" is an alkylene group containing from 1 to 6 carbon atoms.

The preferred dicarboxylic fatty acids are dimerized fatty acids, commercial products prepared by dimerization of unsaturated fatty acids containing from 8 to about 18 carbon atoms, including 9-dodecenoic(cis), 9-tetradecenoic(cis), 9-octadecenoic(cis), octadecatetranoic acids and the like.

Mixtures of dimerized fatty acids may be used.

The preferred secondary dialkanolamine are diethanolamine, diisopropanolamine, and mixtures thereof; diethanolamine is the most preferred secondary dialkanolamine.

The most preferred tertiary trialkanolamine is triethanolamine, but also other tertiary alkanolamines can be used, such as tri-iso-propanolamine, and mixtures of triethanolamine and tri-iso-propanolamine.

The ester amide of the invention can be added to the drilling mud at any stage of its preparation and the method of its introduction in the mud is not critical.

Advantageously, the yield point enhancers of the invention are used for the stabilisation of oil based drilling muds for off-shore deep water drilling operation.

They impart to such muds excellent stability and, being in liquid form, they can be readily dosed.

Another fundamental object of the present invention is an oil based drilling mud containing from 0.05 to 1.0% wt, preferably from 0.1 to 0.5% wt, of the yield point enhancer obtained as described above, by reacting one or more dicarboxylic fatty acids with a secondary dialkanolamine and thereafter with a tertiary trialkanolamine, the percentages being referred to a yield point enhancer of the invention having a total content of solvent and diluent of 50 wt %

According to a preferred embodiment of the invention, the oil based drilling mud is an oil based inverted emulsions, formed by an oily continuous external phase and an aqueous internal phase.

In order to prepare the oil based drilling mud of the invention, water soluble salts, chosen among sodium chloride, potassium chloride, sodium bromide or calcium chloride, are normally added to the oily phase in the form of brines, in concentration between 1 to 50% vol, preferably between 10 to 30% vol, more preferably in concentration of 25% vol (% vol is referred to the final emulsion).

The man skilled in the art is able to determine the appropriate brine to oil ratio, in order to obtain a stable emulsion, while considering and limiting the cost of the drilling fluid.

The oil based drilling mud of the invention normally also contains one or more surfactants (emulsifiers), to stabilise the emulsion; the surfactants can be added to the external phase, to the internal phase or to both phases.

Useful emulsifiers include, rosin acids, tall oil acids and derivatives thereof (such as amido-amines and imidazolines), fatty alcohols and fatty acids, such as oleic acid, caproic acid, stearic acid.

Various modifications and alterations to this invention will become apparent to those skilled in the art without departing from the scope of this invention.

It should be understood that this invention is not intended to be unduly limited by the illustrative embodiments and examples set forth herein.

BRIEF DESCRIPTION OF DRAWINGS

In FIG. 1-6 the results of the application tests (Examples 3 and 4) carried on with oil based drilling muds according to the invention (prepared as described in Example 2) are reported.

EXAMPLE 1

Preparation of the Yield Point Enhancer (YPE1)

736.56 g of dimer acid (1.37 mol) (Unydime® T18, Arizona Chem. Co., US) are charged in a reaction vessel; 405 g of butoxytriglycol are then added the reaction vessel and the mixture is heated up to 95° C. while stirring. 144.36 g of diethanolamine are then slowly added and the temperature is maintained at about 150° C., until 24.66 g of water is collected.

68.40 g of triethanolamine (0.46 mol) are then slowly added; the reaction is slightly exothermic and the temperature is maintained at about 150° C., purging with a moderate flow of nitrogen and collecting water until 24.66 g of water is collected The reaction mixture is then cooled down to 95° C. and 405 g of butoxytriglycol and 90 g of propylene carbonate are added, obtaining 1800 g of final product.

The final product (YPE1) is a amber homogeneous liquid; IR analysis shows a typical amide band at 1627 cm$^{-1}$ and an ester band at 1739 cm$^{-1}$.

EXAMPLE 2

Preparation of the Oil Based Muds

The muds are prepared by mixing 158.34 g of organic phase (Diesel, or an internal olefin mixture C16-C18, or a mineral oil) and 82.443 g of 25% wt CaCl$_2$ brine and then emulsifying in the presence of an organophilic clay, lime, an imidazoline based primary emulsifier, Ecotrol® (fluid loss reducer from M-I L.L.C, US), barite, and YPE1.

The composition of the muds (in g) is reported in Table 1.

TABLE 1

|  | D | Do | O | Oo | MO | MOo |
|---|---|---|---|---|---|---|
| Diesel | 158.34 | 158.34 |  |  |  |  |
| IO 16-18[1] |  |  | 158.34 | 158.34 |  |  |
| M.O.[2] |  |  |  |  | 158.34 | 158.34 |
| 25% CaCl2 | 82.44 | 82.44 | 82.44 | 82.44 | 82.44 | 82.44 |
| O.C.[3] | 4 | 4 | 4 | 4 | 4 | 4 |
| Lime | 3 | 3 | 3 | 3 | 3 | 3 |
| Im[4] | 8 | 8 | 8 | 8 | 8 | 8 |
| Ecotrol | 0.5 | 0.5 | 0.5 | 0.5 | 0.5 | 0.5 |
| Barite | 185 | 185 | 185 | 185 | 185 | 185 |
| YPE1 | 1 | 0.00 | 0.5 | 0.00 | 2 | 0.00 |

[1]Internal olefin mixture C16-C18
[2]Mineral oil
[3]Organophilic Clay
[4]Imidazoline based primary emulsifier Application Tests.

EXAMPLE 3

The yield point of the muds sheared at 8000 rpm with Hamilton Beach is measured at 25° C. at intervals.

Figure 1:
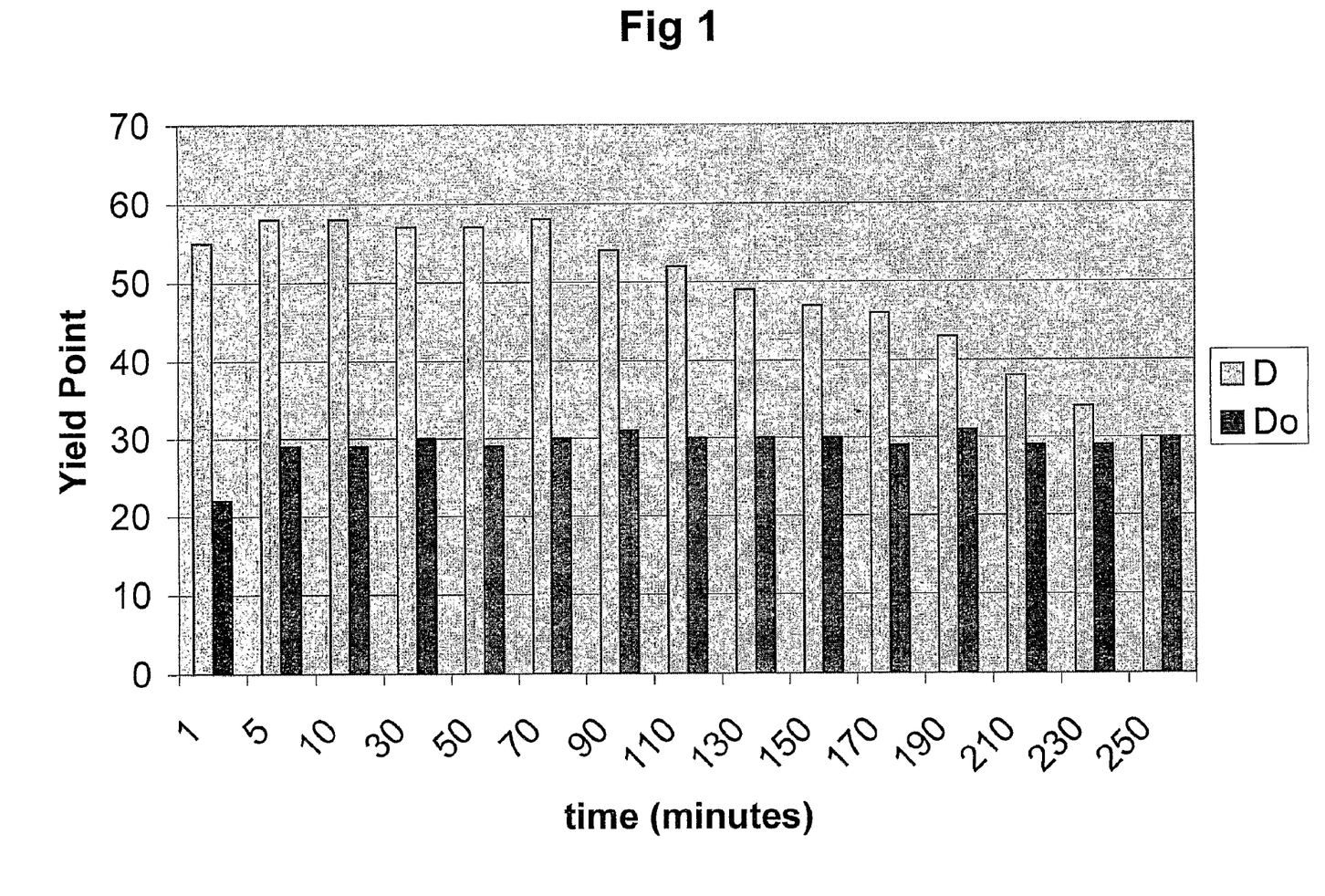
FIG. 1-3 show the decrease of the yield point of oil based drilling muds according to the invention (D, O, MO) in comparison with the yield point of the analogous muds not containing the yield point enhancer of the invention (blanks: Do, Oo, MOo), when muds are exposed to shear stress (see Example 3).
Figure 2:
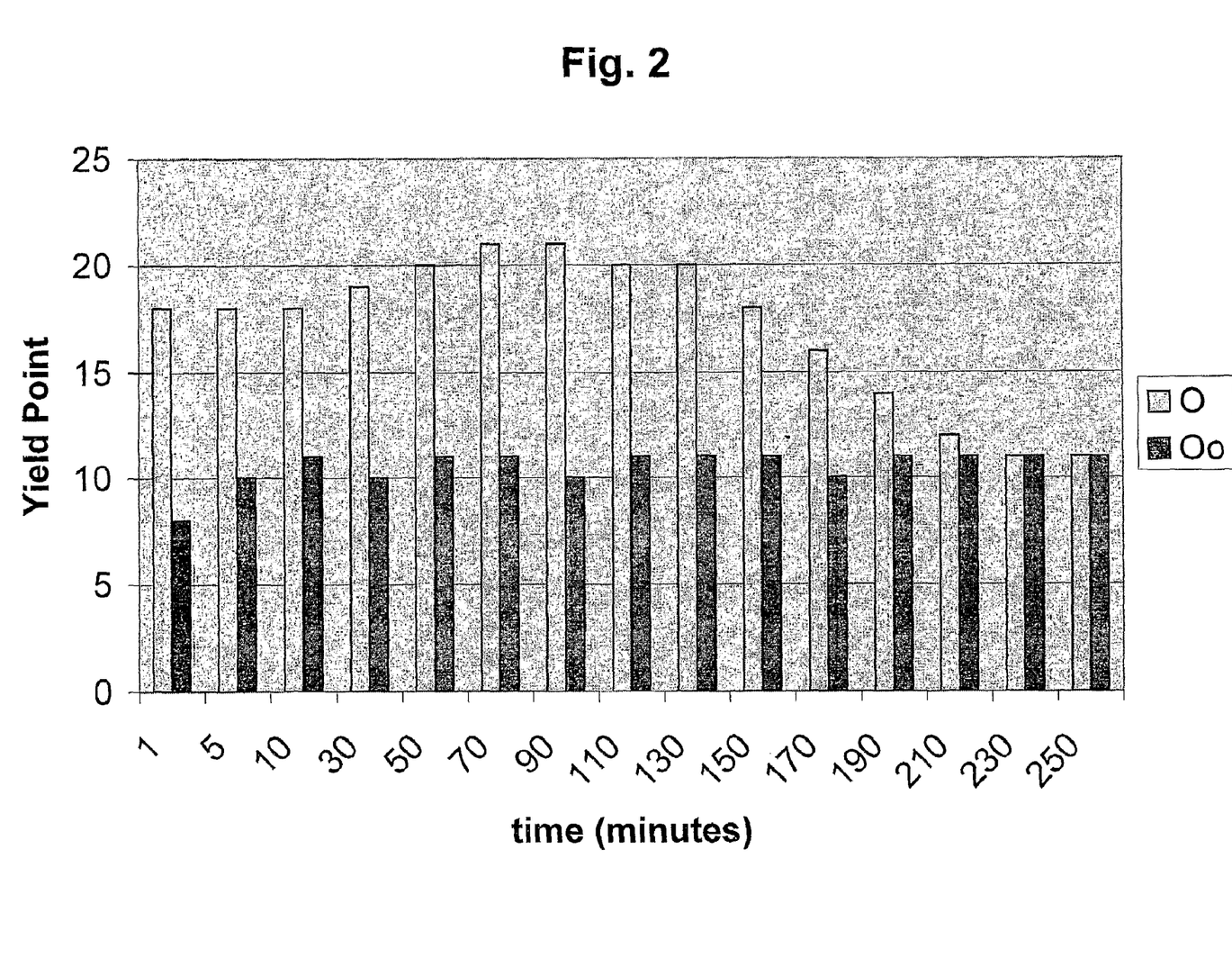
Figure 3:
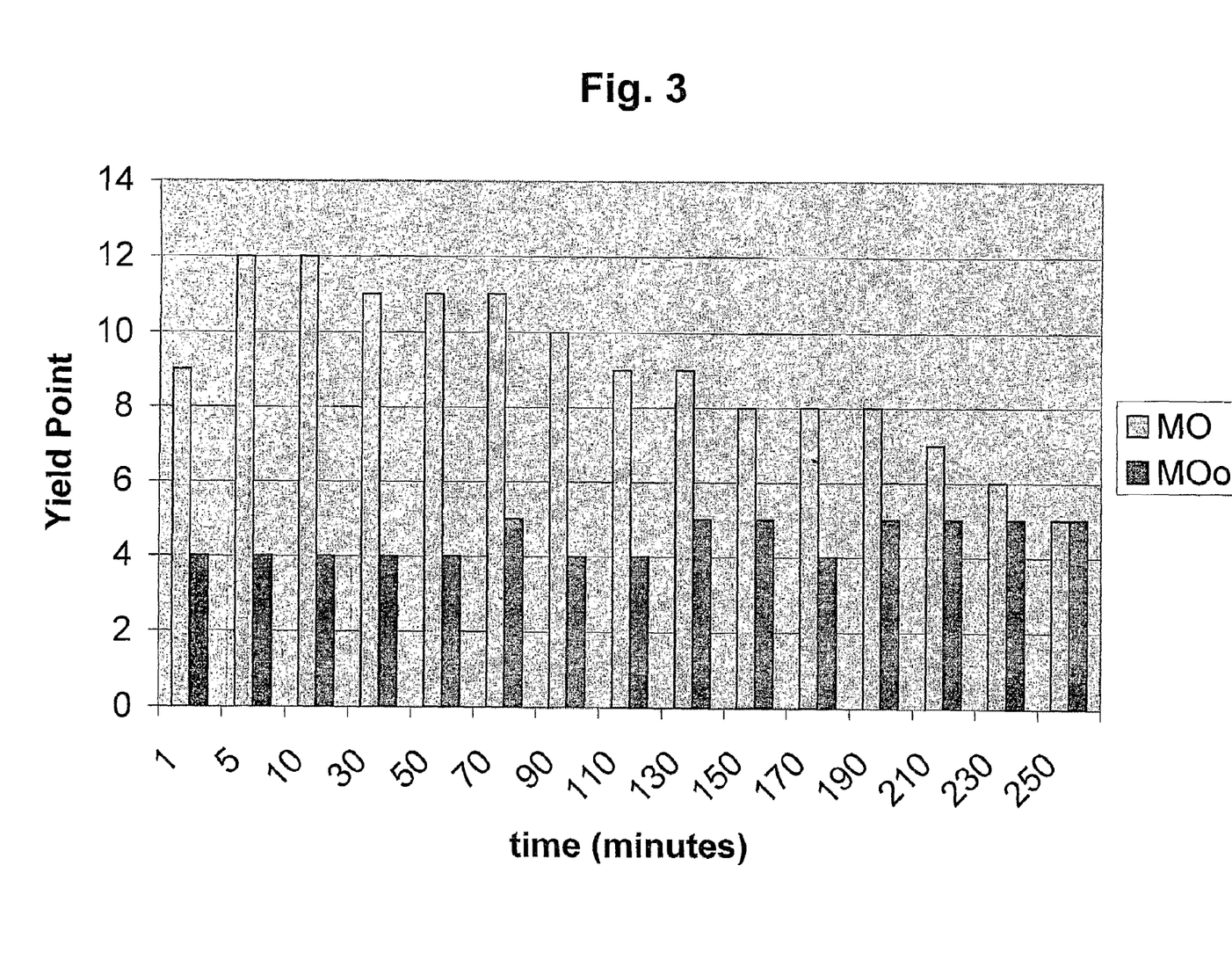

The results are reported in Table 2, and as a graph, in FIG. 1-3.

TABLE 2

| | Yield Point | | | | | |
|---|---|---|---|---|---|---|
| time (min) | D | Do | O | Oo | MO | MOo |
| 1 | 55 | 22 | 18 | 8 | 9 | 4 |
| 5 | 58 | 29 | 18 | 10 | 12 | 4 |
| 10 | 58 | 29 | 18 | 11 | 12 | 4 |
| 30 | 57 | 30 | 19 | 10 | 11 | 4 |
| 50 | 57 | 29 | 20 | 11 | 11 | 4 |
| 70 | 58 | 30 | 21 | 11 | 11 | 5 |
| 90 | 54 | 31 | 21 | 10 | 10 | 4 |
| 110 | 52 | 30 | 20 | 11 | 9 | 4 |
| 130 | 49 | 30 | 20 | 11 | 9 | 5 |
| 150 | 47 | 30 | 18 | 11 | 8 | 5 |
| 170 | 46 | 29 | 16 | 10 | 8 | 4 |
| 190 | 43 | 31 | 14 | 11 | 8 | 5 |
| 210 | 38 | 29 | 12 | 11 | 7 | 5 |
| 230 | 34 | 29 | 11 | 11 | 6 | 5 |
| 250 | 30 | 30 | 11 | 11 | 5 | 5 |

EXAMPLE 4

The muds are heated to 65° C. under low shear condition and their yield point is measured at intervals of 10 minutes.

Figure 4:
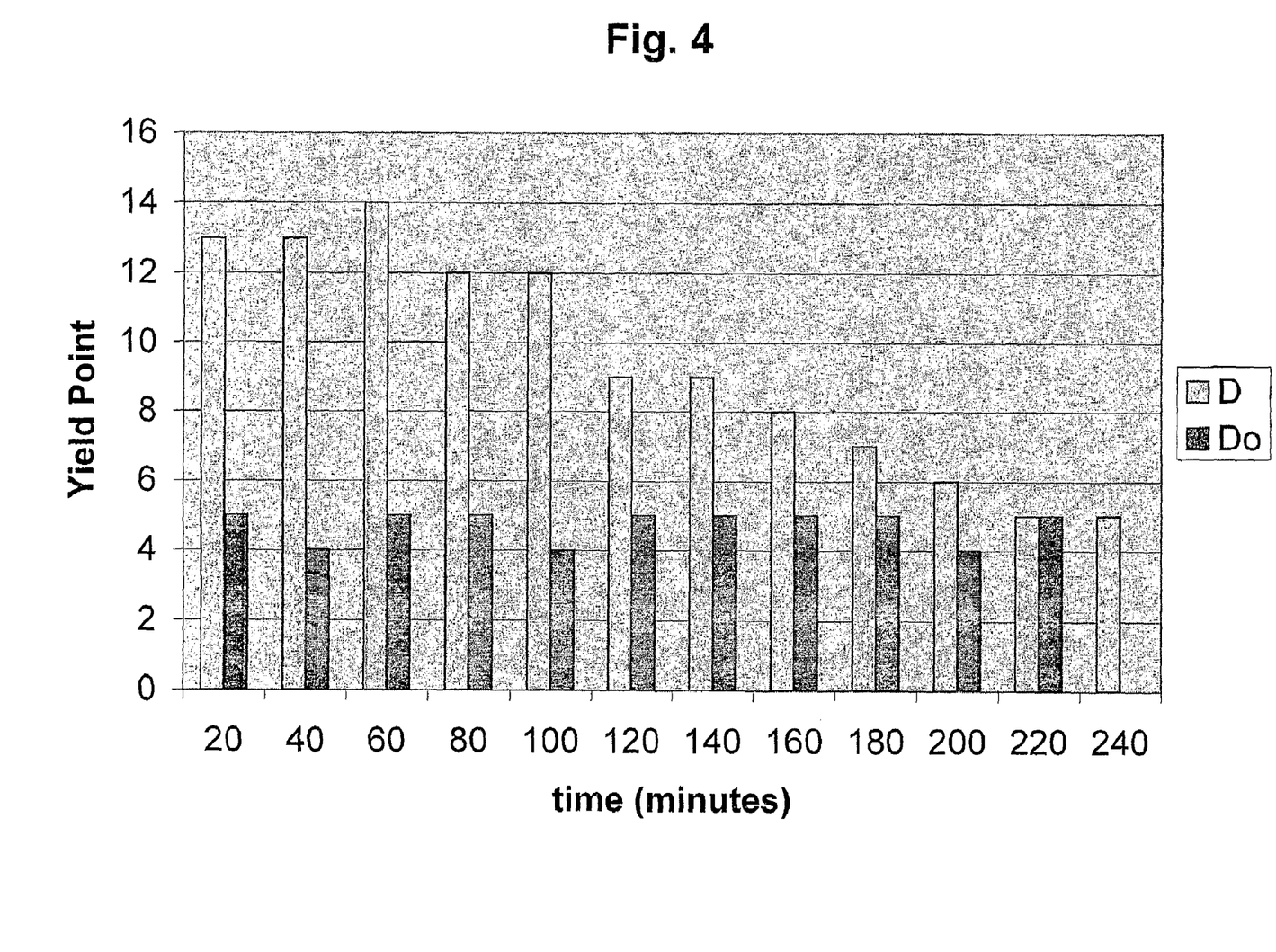
FIG. 4-6 show the decrease of the yield point of oil based drilling muds according to the invention (D, O, MO) in comparison with the yield point of the analogous muds not containing the yield point enhancer of the invention (blanks: Do, Oo, MOo), when muds are exposed to heat (see Example 4).
Figure 5:
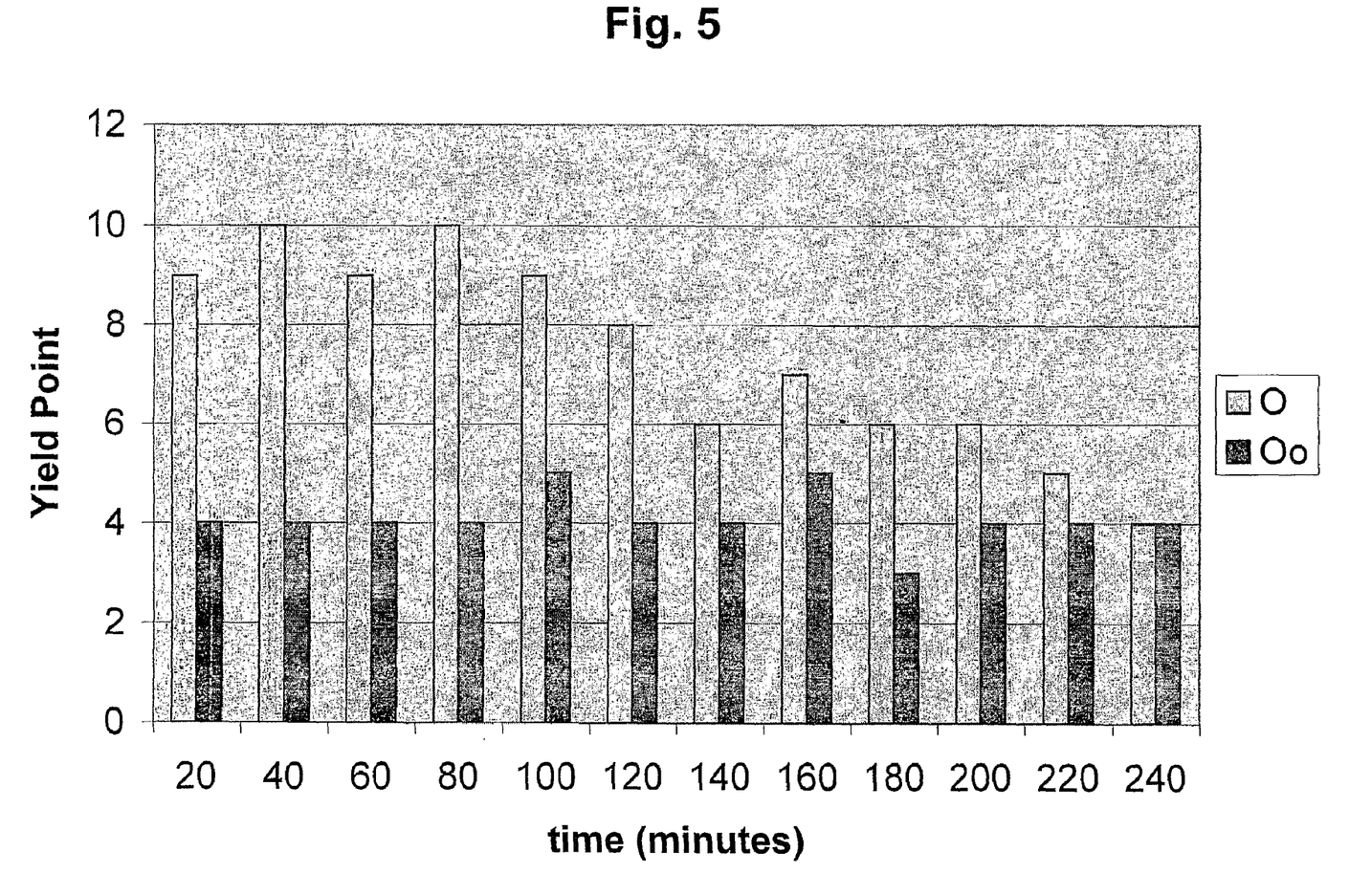
Figure 6:
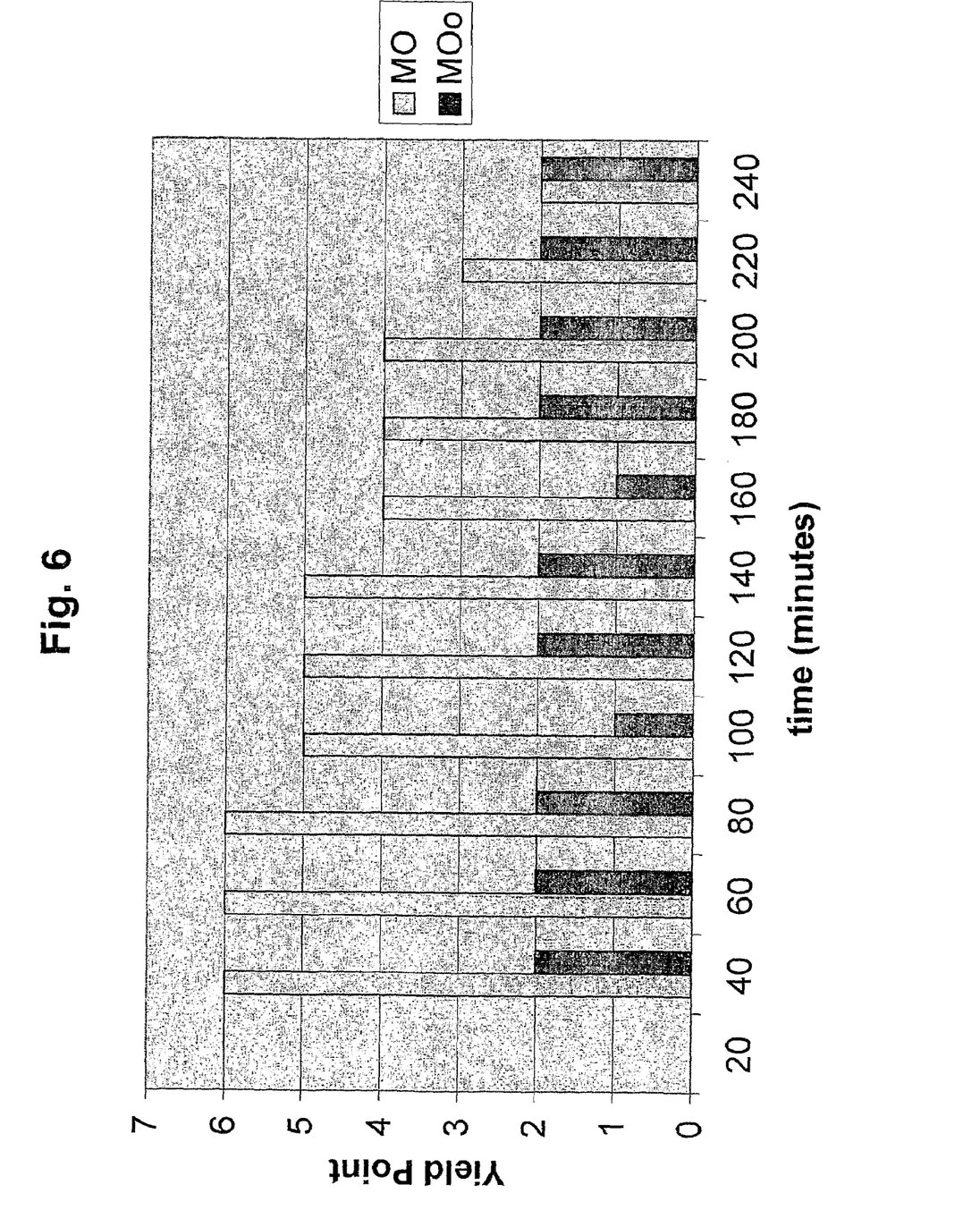

The results are reported in Table 3, and as a graph, in FIG. 4-6.

TABLE 3

| | Yield Point | | | | | |
|---|---|---|---|---|---|---|
| time (min) | D | Do | O | Oo | MO | MOo |
| 20 | 13 | 5 | 9 | 4 | — | — |
| 40 | 13 | 4 | 10 | 4 | 6 | 2 |
| 60 | 14 | 5 | 9 | 4 | 6 | 2 |
| 80 | 12 | 5 | 10 | 4 | 6 | 2 |
| 100 | 12 | 4 | 9 | 5 | 5 | 1 |
| 120 | 9 | 5 | 8 | 4 | 5 | 2 |
| 140 | 9 | 5 | 6 | 4 | 5 | 2 |
| 160 | 8 | 5 | 7 | 5 | 4 | 1 |
| 180 | 7 | 5 | 6 | 3 | 4 | 2 |
| 200 | 6 | 4 | 6 | 4 | 4 | 2 |
| 220 | 5 | 5 | 5 | 4 | 3 | 2 |
| 240 | 5 | — | 4 | 4 | 2 | 2 |

The application tests show that the yield point enhancer of the invention, both under shear stress and heat (simulation of drilling operating conditions), breaks down without changing any properties of the original mud.

The invention claimed is:

1. A yield point enhancer for use in oil based drilling muds comprising the product obtained from a process comprising:
   in a first step, (i) reacting:
      about one molar equivalent of one or more dicarboxylic fatty acids having a general formula HOOC—R—COOH wherein R is an alkylene group containing from 10 to 50 carbon atoms,
      with about one molar equivalent of a secondary dialkanolamine having the general formula HO—R'—NH—R'OH wherein R' is an alkylene group containing from 1 to 6 carbon atoms,
      at about 150° C. while collecting water and keeping the reaction mixture stirred until about one molar equivalent of water is collected to form an intermediate; and
   in a second step (ii), reacting,
      the intermediate with about one third of a molar equivalent of a tertiary trialkanolamine having the general formula N(—R"OH)$_3$ wherein R" is an alkylene group containing from 1 to 6 carbon atoms,
      at 120-150° C. while collecting water and keeping the reaction mixture stirred until about one molar equivalent of water is collected.

2. The yield point enhancer according to claim 1, wherein the yield point enhancer is an ester amide.

3. The yield point enhancer according to claim 1, wherein R is an alkylene group containing from 20 to 40 carbon atoms.

4. The yield point enhancer according to claim 3, wherein the dicarboxylic fatty acids are dimerized fatty acids prepared by dimerization of unsaturated fatty acids containing from 8 to about 18 carbon atoms.

5. The yield point enhancer according to claim 4, wherein the secondary dialkanolamine is diethanolamine and the tertiary trialkanolamine is triethanolamine.

6. The yield point enhancer according to claim 5, obtained by performing steps (i) and (ii) in the presence of a compound selected from the group consisting of glycols, glycol ethers, and mixtures thereof.

7. The yield point enhancer according to claim 6, wherein steps (i) and (ii) are performed in the presence of a glycol ether selected from the group consisting of diethylene glycol mono-n-butyl ether, diethylene glycol ethyl ether, ethylene glycol mono-n-butyl ether, butoxytriglycol, and mixtures thereof.

8. The yield point enhancer according to claim 7, wherein the glycol ether is butoxytriglycol.

9. The yield point enhancer according to claim 7, further comprising the product obtained by admixing the product of step (ii) with a diluent.

10. The yield point enhancer according to claim 9, wherein the diluent is selected from the group consisting of diethylene glycol mono-n-butyl ether, diethylene glycol ethyl ether, ethylene glycol mono-n-butyl ether, butoxytriglycol, propylene carbonate and mixtures thereof.

11. The yield point enhancer according to claim 10, wherein the diluent is present at a concentration of from 30 to 70% wt.

12. An oil based drilling mud comprising from about 0.025 to about 0.5% wt of a yield point enhancer, the yield point enhancer being obtained from a process comprising:
   in a first step, (i) reacting:
      about one molar equivalent of one or more dicarboxylic fatty acids having a general formula HOOC—R—COOH wherein R is an alkylene group containing from 10 to 50 carbon atoms,
      with about one molar equivalent of a secondary dialkanolamine having the general formula HO—R'—NH—R'OH wherein R' is an alkylene group containing from 1 to 6 carbon atoms,
      at about 150° C. while collecting water and keeping the reaction mixture stirred until about one molar equivalent of water is collected to form an intermediate; and
   in a second step (ii), reacting,
      the intermediate with about one third of a molar equivalent of a tertiary trialkanolamine having the general formula N(—R"OH)$_3$ wherein R" is an alkylene group containing from 1 to 6 carbon atoms, at 120-150° C. while collecting water and keeping the reaction mixture stirred until about one molar equivalent of water is collected.

13. The oil based drilling mud according to claim 12, wherein the oil based drilling mud is prepared using a 1:1 wt % admixture of the yield point enhancer and a diluent.

14. The oil based drilling mud according to claim 12, wherein the yield point enhancer is an ester amide.

15. The oil based drilling mud according to claim 12, wherein R is an alkylene group containing from 20 to 40 carbon atoms.

16. The oil based drilling mud according to claim 15, wherein the dicarboxylic fatty acids are dimerized fatty acids prepared by dimerization of unsaturated fatty acids containing from 8 to about 18 carbon atoms.

17. The oil based drilling mud according to claim 16, wherein the secondary dialkanolamine is diethanolamine and the tertiary trialkanolamine is triethanolamine.

18. The oil based drilling mud according to claim 17, wherein the yield point enhancer is obtained by performing steps (i) and (ii) in the presence of a compound selected from the group consisting of glycols, glycol ethers, and mixtures thereof.

19. The oil based drilling mud according to claim 18, wherein the glycol ether is butoxytriglycol.

20. An oil based drilling mud according to claim 12, wherein the oil based drilling mud is in the form of inverted emulsion.

* * * * *